(12) United States Patent
Waumans et al.

(10) Patent No.: US 8,921,266 B2
(45) Date of Patent: Dec. 30, 2014

(54) COLOUR LASER MARKING OF ARTICLES AND SECURITY DOCUMENTS

(75) Inventors: Bart Waumans, Puurs (BE); Paul Callant, Edegem (BE)

(73) Assignee: Agfa-Gevaert N.V., Mortsel (BE)

( * ) Notice: Subject to any disclaimer, the term of this patent is extended or adjusted under 35 U.S.C. 154(b) by 0 days.

(21) Appl. No.: 14/124,312

(22) PCT Filed: May 10, 2012

(86) PCT No.: PCT/EP2012/058612
§ 371 (c)(1),
(2), (4) Date: Dec. 6, 2013

(87) PCT Pub. No.: WO2012/171728
PCT Pub. Date: Dec. 20, 2012

(65) Prior Publication Data
US 2014/0099482 A1    Apr. 10, 2014

Related U.S. Application Data

(60) Provisional application No. 61/498,623, filed on Jun. 20, 2011.

(30) Foreign Application Priority Data

Jun. 17, 2011   (EP) .................................. 11170294

(51) Int. Cl.
| | | |
|---|---|---|
| B41M 3/14 | (2006.01) | |
| B41M 5/26 | (2006.01) | |
| B41M 5/327 | (2006.01) | |
| B41M 5/333 | (2006.01) | |
| B41M 5/337 | (2006.01) | |
| B42D 15/00 | (2006.01) | |
| B42D 15/10 | (2006.01) | |
| B41J 2/44 | (2006.01) | |
| B42D 25/00 | (2014.01) | |
| B41M 7/00 | (2006.01) | |
| B41M 5/44 | (2006.01) | |
| B41M 5/41 | (2006.01) | |

(52) U.S. Cl.
CPC ............. B41M 3/144 (2013.01); B41M 5/3372 (2013.01); B42D 15/10 (2013.01); *B41M 2205/38* (2013.01); B41M 5/44 (2013.01); B41J 2/442 (2013.01); *B41M 2205/04* (2013.01); *B41M 5/3375* (2013.01); *B41M 5/3336* (2013.01); B42D 15/0013 (2013.01); *B41M 5/41* (2013.01); B41M 5/267 (2013.01); B41M 3/142 (2013.01); *B41M 5/327* (2013.01); B41M 7/009 (2013.01); *Y10S 430/146* (2013.01)
USPC ............ 503/214; 283/95; 347/264; 430/200; 430/945; 503/209; 503/216; 503/221

(58) Field of Classification Search
CPC ...... B41M 3/142; B41M 5/267; B41M 5/327; B41M 5/3336; B41M 5/3372; B42D 15/0013; B42D 15/10; B42D 2031/10; B41J 2/442
USPC ................... 503/209, 214, 216, 221; 283/95; 347/264; 430/200, 945
See application file for complete search history.

(56) References Cited

U.S. PATENT DOCUMENTS

| | | |
|---|---|---|
| 3,649,336 A | 3/1972 | Van Paesschen et al. |
| 4,663,518 A | 5/1987 | Borror et al. |
| 4,720,449 A | 1/1988 | Borror et al. |
| 5,219,703 A | 6/1993 | Bugner et al. |
| 5,243,052 A | 9/1993 | Taylor et al. |
| 6,100,009 A | 8/2000 | Obayashi et al. |
| 7,158,145 B1 | 1/2007 | Fannasch et al. |
| 2004/0182268 A1 | 9/2004 | Deroover et al. |
| 2005/0001419 A1 | 1/2005 | Levy et al. |

FOREIGN PATENT DOCUMENTS

| | | |
|---|---|---|
| EP | 0174054 A2 | 3/1986 |
| EP | 0605149 A2 | 7/1994 |
| EP | 0675003 A1 | 10/1995 |
| EP | 0739748 A1 | 10/1996 |
| EP | 0779540 A1 | 6/1997 |
| EP | 1452334 A2 | 9/2004 |
| EP | 2181858 A1 | 5/2010 |
| GB | 811066 | 3/1959 |
| GB | 1441591 | 7/1976 |
| WO | WO 2009/140083 A2 | 11/2009 |

*Primary Examiner* — Bruce H Hess
(74) *Attorney, Agent, or Firm* — Leydig, Voit, Mayer, Ltd.

(57) ABSTRACT

A method for preparing a color laser marked article comprising the steps of: a) infrared laser marking a security element including a polymeric support and a color forming layer comprising a color forming compound, an infrared dye and a polymeric binder comprising vinyl acetate and at least 85 wt % of vinyl chloride based on the total weight of the binder; and b) exposing the laser marked security element with light having a wavelength higher than 440 nm. The light exposure of step b) hinders the falsification of an issued security document without significant increase of background density.

15 Claims, No Drawings

COLOUR LASER MARKING OF ARTICLES AND SECURITY DOCUMENTS

CROSS-REFERENCE TO RELATED APPLICATIONS

This patent application is a U.S. National Phase Patent Application of International Patent Application No. PCT/EP2012/058612, filed May 10, 2012 (published as International Patent Application Publication No. WO 2012/171728 A1), which claims the benefit of European Patent Application No. 11170294.0, filed Jun. 17, 2011, and U.S. Provisional Patent Application No. 61/498,623, filed Jun. 20, 2011, all of which are hereby incorporated by reference in their entireties.

TECHNICAL FIELD

This invention relates to methods for colour laser marking articles, especially security documents, and to the resulting laser marked articles and security documents.

BACKGROUND ART

Articles are laser marked in order to ensure product safety and authenticity. For example, packaging material of pharmaceuticals is laser marked to enable a consumer to know the genuineness of a product. Security cards are widely used for various applications such as identification purposes (ID cards) and financial transfers (credit cards). Such cards typically consist of a laminated structure consisting of various papers or plastic laminates and layers wherein some of them may carry alphanumeric data and a picture of the card holder. So called 'smart cards' can also store digital information by including an electronic chip in the card body.

A principal objective of such articles and security cards is that they cannot be easily modified or reproduced in such a way that the modification or reproduction is difficult to distinguish from the original.

Two techniques frequently used for preparing security documents are laser marking and laser engraving. In literature, laser engraving is often incorrectly used for laser marking. In laser marking, a colour change is observed by local heating of material, while in laser engraving material is removed by laser ablation.

Today, laser marking employed in the manufacture of security documents consists solely of a "black" laser marking method via the carbonization of a polymer, usually polycarbonate as disclosed in e.g. EP 2181858 A (AGFA)). Recently, there has been considerable interest in being able to produce colour images through laser marking.

US 2005001419 (DIGIMARK) discloses a colour laser engraving method and a security document including an opaque surface layer and one or more coloured sub-layers. A laser provides openings in the surface layer to expose the colour of the sub-layer thereby creating colour images and text. Such a security document can be falsified by providing additional holes or filling up existing holes on the security document.

U.S. Pat. No. 7,158,145 (ORGA SYSTEMS) discloses a three-wavelength system (440, 532 and 660 nm) for applying coloured information to a document by means of wavelength-selective bleaching of chromophoric particles in a layer close to the surface. Although a bleached colour cannot be restored, modification of the coloured information remains possible by extra bleaching.

U.S. Pat. No. 4,720,449 (POLAROID) discloses a thermal imaging method for producing colour images on a support carrying at least one layer of a colourless compound, such as di- or triarylmethane, by conversion of electromagnetic radiation into heat. The laser beam may have different wavelengths in a range above 700 nm with at least about 60 nm apart so that each imaging layer having a different infrared absorber may be exposed separately to convert a colourless triarylmethane compound into a coloured form. There is however no disclosure how to prevent modification of the colour image by additional laser marking, which is also the case for similar imaging methods disclosed in WO 2009/140083 (3M) and U.S. Pat. No. 4,663,518 (POLAROID)

U.S. Pat. No. 5,219,703 (KODAK) discloses a laser-induced thermal dye transfer imaging method wherein the infrared dye absorbs laser radiation and converts it into heat which vaporizes dyes in a dye-donor element which are transferred to a dye-receiver element. After transfer, the infrared dyes which cause an undesirable visual light absorption in the dye-receiver element are bleached by an acid-photogenerating compound upon subsequent exposure to infrared or ultraviolet radiation. The infrared dyes in the thermal dye transfer material of EP 675003 A (3M) are bleached using a thermal bleaching agent upon exposure to infrared radiation.

A solution to hinder or prevent modification of the colour image by additional laser marking would be to use the bleaching of the infrared dye as applied in the field of thermal dye transfer imaging. However, bleaching with UV radiation generally results in colour formation from the colourless dye. Radiation of an infrared laser results also in additional colour formation, while a long infrared exposure of low intensity not resulting in colour formation is economically not viable.

Therefore, it would be desirable to have a secure colour laser marking system for producing security documents wherein the laser marked colour image cannot be modified by additional colour laser marking.

SUMMARY OF INVENTION

In order to overcome the problems described above, preferred embodiments of the present invention include a method for preparing a colour laser marked article as described herein.

It has been surprisingly found that using visual light above 440 nm allowed bleaching of the infrared dye without additional colour formation in a security element including as essential features a colourless leuco dye, an infrared dye and a polymeric binder comprising vinyl acetate and at least 85 wt % of vinyl chloride based on the total weight of the binder.

An improvement of light stability of the security element was also observed. This is an additional advantage since, for example, a security card kept for a prolonged time in intense sun light can have a discoloration of the background density ($D_{min}$).

Further advantages and embodiments of the present invention will become apparent from the following description.

DEFINITIONS

The terms "polymeric support" and "foil", as used in disclosing the present invention, mean a self-supporting polymer-based sheet, which may be associated with one or more adhesion layers e.g. subbing layers. Supports and foils are usually manufactured through extrusion.

The term "layer", as used in disclosing the present invention, is considered not to be self-supporting and is manufactured by coating it on a support or a foil.

"PET" is an abbreviation for polyethylene terephthalate.

"PETG" is an abbreviation for polyethylene terephthalate glycol, the glycol indicating glycol modifiers which are incorporated to minimize brittleness and premature aging that occur if unmodified amorphous polyethylene terephthalate (APET) would be used in the production of cards.

"PET-C" is an abbreviation for crystalline PET, i.e. a biaxially stretched polyethylene terephthalate. Such a polyethylene terephthalate support has excellent properties of dimensional stability.

The definitions of security features correspond with the normal definition as adhered to in the "Glossary of Security Documents—Security features and other related technical terms" as published by the Consilium of the Council of the European Union on Aug. 25, 2008 (Version: v.10329.02.b.en) on its website: http://www.consilium.europa.eu/prado/EN/glossaryPopup.html.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methylbutyl etc.

Laser Marking Methods

The method for preparing a colour laser marked article according to the present invention comprises the steps of:
a) laser marking with an infrared laser of a security element including a colour forming layer comprising a colour forming compound, an infrared dye and a polymeric binder comprising vinyl acetate and at least 85 wt % of vinyl chloride based on the total weight of the binder; and
b) exposing the laser marked security element with light having a wavelength higher than 440 nm.

In a preferred embodiment, the light of the exposure in step b) has a wavelength of less than 700 nm. This allows the use of a higher light intensity allowing a faster bleaching of the infrared dye without addition colour formation by the colour forming compound. In a particularly preferred embodiment, this higher light intensity is realized by using a laser, e.g. an Argon laser (488 nm), or a LED having an emission wavelength between 440 nm and 700 nm, more preferably between 445 nm and 690 nm and most preferably between 455 nm and 610 nm. A higher productivity can be obtained since faster bleaching means that e.g. a security document can be manufactured faster.

The laser marking in step a) can also already cause some bleaching of the infrared dye, thereby requiring a less intense light exposure in step b) in the laser marked areas. This can be advantageously used since bleaching with visual light in laser marked areas can sometimes also cause a bleaching of the colour formed from the colour forming compound. Hence bleaching with higher light intensity in non-laser marked areas than in laser marked areas results in brighter colours.

In an alternative embodiment, the exposure in step b) is performed as an overall exposure. This has the advantage that the laser marking device is simpler to operate because no distinction has to be made between laser marked and non-laser marked areas.

In a preferred embodiment of the colour laser marking method, the security element is laser marked through a transparent biaxially stretched polyethylene terephthalate foil (PET-C). This PET-C foil is preferably used as support for the colour forming layer.

The advantage of a PET-C foil, such as PETix™ from Agfa-Gevaert NV, it is that is very durable and resistant to mechanical influences (flexion, torsion, scratches), chemical substances, moisture and temperature ranges. This is especially useful for security documents such as identification cards and credit cards for which the average daily usage has augmented substantially from less than 1 time per week to 4 times per day. The card body has to withstand not only this increased usage, but also the associated storage conditions. Cards are no longer safely tucked away in cabinets at home or seldom-opened wallets, but are now loosely put away in pockets, purses, sport bags etc.—ready for immediate use.

PVC (polyvinylchloride) is the most widely used material for plastic cards but has low durability of the card body, resulting in an effective lifetime of only 1-3 years, much lower than the lifetime of the often expensive chips included in the card. Other materials like Teslin™ and ABS are only suitable for very low-end or single-use cards. PC (polycarbonate) can be used for longer-life and more secure ID cards, but has a high production cost and a low resistance to torsion, scratching and chemicals.

Security Elements and Colour Laser Marked Articles

The colour laser marked article according to the present invention is obtained by the laser marking method as described above. The security element which is laser marked includes at least a support and a colour forming layer. In a preferred embodiment, the colour laser marked article contains more than one colour forming layer, so that a multicolour laser marked article can be obtained.

Light having a wavelength preferably between 440 nm and 700 nm is used to impede the alteration by colour laser marking of an infrared laser marked security element including a colour forming compound, an infrared dye and a polymeric binder including vinyl acetate and at least 85 wt % of vinyl chloride based on the total weight of the binder.

In one preferred embodiment, the article is a security document. The security document, prepared from a security document precursor as security element, is preferably selected from the group consisting of a passport, a personal identification card and a product identification document.

The security document preferably also contains electronic circuitry, more preferably the electronic circuitry includes a RFID chip with an antenna and/or a contact chip. The security document is preferably a "smart card", meaning an identification card incorporating an integrated circuit. In a preferred embodiment the smart card includes a radio frequency identification or RFID-chip with an antenna. Inclusion of electronic circuitry makes forgery more difficult.

The security document preferably has a format as specified by ISO 7810. ISO 7810 specifies three formats for identity cards: ID-1 with the dimensions 85.60 mm×53.98 mm, a thickness of 0.76 mm is specified in ISO 7813, as used for bank cards, credit cards, driving licenses and smart cards; ID-2 with the dimensions 105 mm×74 mm, as used in German identity cards, with typically a thickness of 0.76 mm; and ID-3 with the dimensions 125 mm×88 mm, as used for passports and visa's. When the security cards include one or more contactless integrated circuits then a larger thickness is tolerated, e.g. 3 mm according to ISO 14443-1.

In another preferred embodiment, the security element is a product identification document which is usually attached to the packaging material of the product or to the product itself. The product identification document not only allows to verify the authenticity of the product, but also to maintain the attractive look of a product (packaging).

In a very preferred embodiment, the colourless colour forming layer of the security element includes an infrared dye, a colourless leuco dye as the colour forming compound, a polymeric binder including at least 85 wt % of a vinyl chloride and at least 1 wt % of vinyl acetate both based on the total weight of the binder, and optionally a hydrogen donor-precursor.

Colour Forming Layer

The security element used in the colour laser marking method according to the present invention includes at least a polymeric support and a colour forming layer. The colour forming layer contains a colour forming compound, an infrared dye and a polymeric binder comprising vinyl acetate and at least 85 wt % of vinyl chloride based on the total weight of the binder. The colour forming layer may further include a thermal acid generating compound. The colour forming layer is preferably colourless.

The colour forming layer(s) can be coated onto the support by any conventional coating technique, such as dip coating, knife coating, extrusion coating, spin coating, slide hopper coating and curtain coating. Preferably the colour forming layer is coated with a slide hopper coater or a curtain coater, more preferably coated onto a transparent polymeric support including a subbing layer.

The dry thickness of the colour forming layer is preferably between 5 and 40 g/m², more preferably between 7 and 25 g/m², and most preferably between 8 and 15 g/m².

The article according to present invention contains at least one colour forming layer, but preferably contains two, three or more colour forming layers for producing a multi-coloured security document.

The article according to present invention is preferably a multi-coloured article containing at least three colour forming layers containing different infrared dyes and colour forming compounds The infrared dye not only delivers the heat for the colour forming action, but also has the advantage that there is no or minimal absorption in the visible spectrum and thus there is no or minimal interference with the colours formed by the one or more colour forming layers. This also allows having, for example, a pure white background in a security document.

In a preferred embodiment the colour forming layer is capable of forming a cyan or blue colour image on laser marking. The article preferably contains two other colour forming layers for forming a magenta respectively a yellow image or for forming a red respectively a green image, since most colour management systems for producing colour images are based on either a CMY or RGB colour reproduction.

Colour Forming Compounds

Colour forming compounds are colourless or slightly yellowish compounds which react into a coloured form.

The colour forming compound is preferably present in the colour forming layer in an amount of 0.5 to 5.0 g/m², more preferably in an amount of 1.0 to 3.0 g/m².

For performing the method of colour laser marking according to the present invention, the following reaction mechanisms and colour forming compounds involved are suitable to form a coloured dye.

1. Fragmentation of a Colourless Dye-Precursor

The reaction mechanism can be represented by:

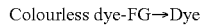

wherein FG represents a fragmenting group.

Such a reaction mechanism is explained in more detail by U.S. Pat. No. 5,243,052 (POLAROID) disclosing the colour formation by fragmentation of a mixed carbonate ester of a quinophthalone dye and a tertiary alkanol containing not more than about 9 carbon atoms.

The fragmentation of a colourless dye-precursor may be catalyzed or amplified by acid generating agents. The dyes G-(18) to G-(36) disclosed by U.S. Pat. No. 6,100,009 (FUJI) are catalyzed or amplified by polymeric acid generating agents based on A-(1) to A-(52), which are also suitable as acid generating agents in the present invention.

Another preferred colourless dye-precursor is the leuco dye-precursor (CASRN104434-37-9) shown in EP 174054 A (POLAROID) which discloses a thermal imaging method for forming colour images by the irreversible unimolecular fragmentation of one or more thermally unstable carbamate moieties of an organic compound to give a visually discernible colour shift from colourless to coloured.

The fragmentation of a leuco dye-precursor may be a two-step reaction mechanism represented by:

wherein FG represents a fragmenting group.

The fragmentation of a colourless leuco dye-precursor may be catalyzed or amplified by acids and acid generating agents. The leuco dye-precursors G-(1) to G-(17) disclosed by U.S. Pat. No. 6,100,009 (FUJI) are catalyzed or amplified by polymeric acid generating agents based on A-(1) to A-(52), which are also suitable as acid generating agents in the present invention.

2. Protonation of a Leuco Dye after Fragmentation of a H-Donor-Precursor

The reaction mechanism can be represented by:

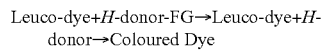

wherein FG represents a fragmenting group.

A preferred H-donor-FG compound includes an ester group as part of its chemical structure (the rest of the compound is represented by the group T) which by laser heating forms a carboxylic acid group:

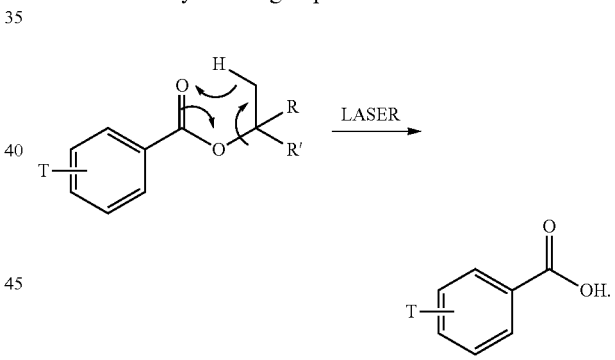

A more preferred H-donor-precursor includes a carbonate group, e.g. a tBOC group, as part of its chemical structure (the rest of the compound is represented by the group T) which by laser heating forms a phenol group:

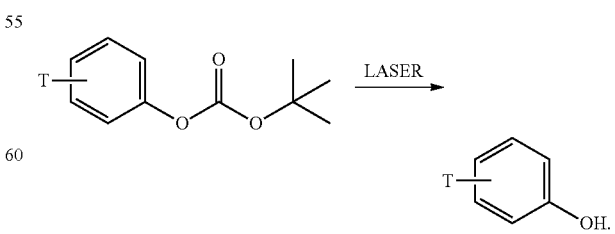

Preferred carbonate groups are given on page 8 of EP 605149 A (JUJO PAPER). In a preferred embodiment, the H-donor-FG compound contains 2 carbonate groups.

The most preferred H-donor-FG compound is:

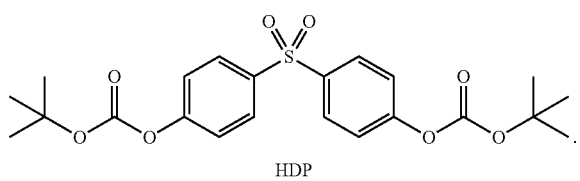 [SMILES: CC(C)(C)OC(=O)Oc1ccc(S(=O)(=O)c2ccc(OC(=O)OC(C)(C)C)cc2)cc1 ; "HDP"]

HDP

The synthesis of compound HDP (CASRN 129104-70-7) is given on page 31 of EP 605149 A (JUJO PAPER) for the compound (19).

In addition to the H-donor, the fragmentation of the H-donor-FG compound above also leads to the formation of a compound having a melting temperature lower than room temperature (20° C.). The formation of such a compound can be used as an additional security feature when the infrared dye is incompletely bleached. After laser marking a security element article through a polymeric support, such as a biaxially stretched polyethylene terephthalate polymeric foil, the compound having a melting temperature lower than room temperature will disturb a second laser marking (falsification of the security document) by the formation of visible blisters especially since higher infrared laser power will be needed due to the bleaching of the infrared dye.

3. Protonation of a Leuco Dye after a Re-Arrangement in a H-Donor-Precursor

The reaction mechanism can be represented by:

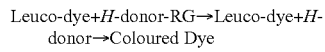

wherein RG represents a rearranging group.

A preferred H-donor-RG compound is capable of forming a compound having an allyl substituted phenol group as part of its chemical structure (the rest of the compound is represented by the group T) by laser heating:

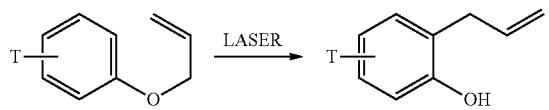

Preferred H-donor-RG compounds include 4-hydroxy-4'-allyloxy diphenylsulfone and 4,4'-diallyloxy diphenylsulfone whereof the synthesis is disclosed by EP 1452334 A (RICOH).

In contrast to the H-donor-FG compound of reaction mechanism 2, no compound having a melting temperature lower than room temperature (20° C.) is produced by the rearrangement of the H-donor-precursor to a hydrogen donor. Consequently, the infrared dye is bleached to a large extent and preferably completely bleached since the security feature of blister formation as possible with the H-donor-FG compound cannot be produced by the H-donor-RG compounds.

The colour formation according to the mechanisms 2 and 3 above are two-component reactions involving a leuco dye and a hydrogen donor-precursor, i.e. a 'H-donor-FG compound' or 'H-donor-RG compound', while the first reaction mechanism is an one-component reaction. The advantage of using a two-component reaction for the colour formation is that the stability, especially the shelf-life stability, can be enhanced. The probability of undesired colour formation due to environment heating is decreased by going from a single step reaction to a two step reaction involving the formation of the H-donor followed by a reaction of the formed H-donor with the leuco dye.

The preferred colour formation mechanism is the protonation of a leuco dye after fragmentation of the H-donor since it includes both advantages of the blister formation security feature and the enhanced shelf-life stability and does not require full bleaching of the infrared dye.

In a preferred embodiment of the colour forming layer, a combination is used of 4,4'-Bis(tert-butoxycarbonyloxy) diphenylsulfone (CASRN 129104-70-7) as the H-donor-FG compound with the leuco dye crystal violet lactone (CASRN 1552-42-7).

In a preferred embodiment, the magenta colour forming compound has a structure according to Formula MCFC:

Formula MCFC

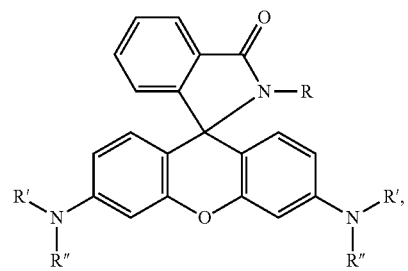

wherein R, R', R" are independently selected from the group consisting of a linear alkyl group, a branched alkyl group, an aryl and aralkyl group; or R' and R" are linked to form a heterocyclic ring.

In one embodiment of the magenta colour forming compound has a structure according to Formula MCFC, the R, R', R" may independently represent a linear alkyl group, a branched alkyl group, an aryl or an aralkyl group substituted by at least one functional group containing an oxygen atom, a sulphur atom or a nitrogen atom.

Particularly preferred magenta colour forming compounds include the compounds M-1 to M-6 of Table 1.

TABLE 1

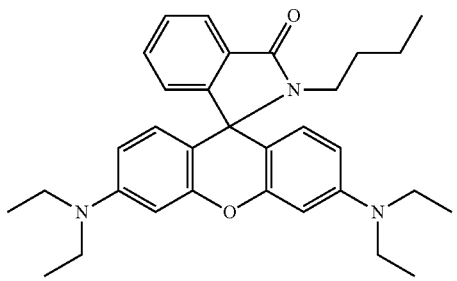 [SMILES: CCCCN1C(=O)c2ccccc2C12c1ccc(N(CC)CC)cc1Oc1cc(N(CC)CC)ccc12]

M-1

TABLE 1-continued

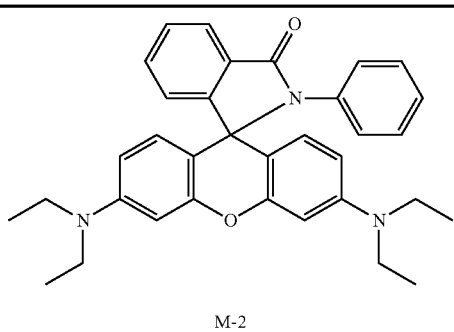

M-2

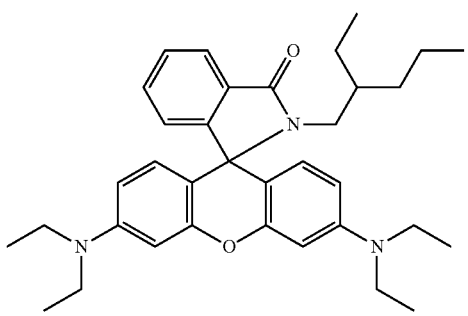 [SMILES: CCCC(CC)CN1C(=O)c2ccccc2C12c1ccc(N(CC)CC)cc1Oc1cc(N(CC)CC)ccc12]

M-3

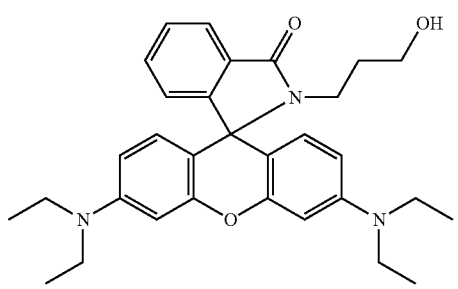 [SMILES: CCN(CC)c1ccc2c(c1)Oc1cc(N(CC)CC)ccc1C21c2ccccc2C(=O)N1CCCO]

M-4

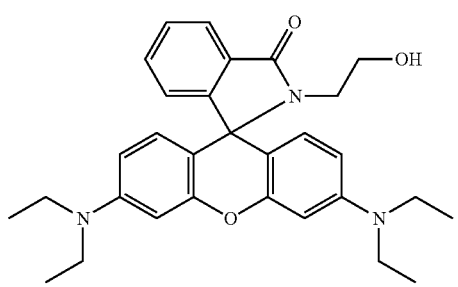 [SMILES: CCN(CC)c1ccc2c(c1)Oc1cc(N(CC)CC)ccc1C21c2ccccc2C(=O)N1CCO]

M-5

TABLE 1-continued

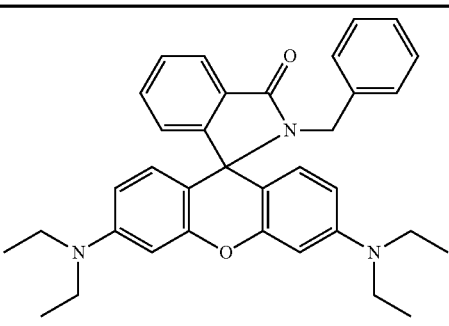

M-6

In a preferred embodiment, the yellow colour forming compound has a structure according to Formula YCFC:

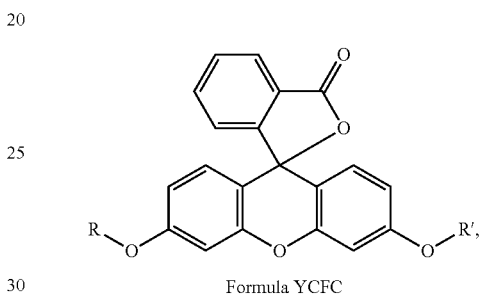

Formula YCFC wherein R, R' are independently selected from a group consisting of a linear alkyl group, a branched alkyl group, an aryl and aralkyl group.

In one embodiment of the yellow colour forming compound has a structure according to Formula YCFC, the R and R' may independently represent a linear alkyl group, a branched alkyl group, an aryl or an aralkyl group substituted by at least one functional group containing an oxygen atom, a sulphur atom or a nitrogen atom.

A particularly preferred yellow colour forming compound is the compound according to Formula YCFC wherein both R and R' are methyl.

Infrared Dyes

The colour forming layer of the security element contains an infrared dye for the conversion of electromagnetic radiation into heat when the layer is laser marked by the infrared laser. The infrared absorber in the colour forming layer is an infrared dye because infrared pigments are much more difficult to bleach than an infrared dye.

When multicoloured articles are desired, then the security element includes a plurality of colourless colour forming layers containing different infrared dyes and colour forming compounds. The infrared dyes differ in wavelength of maximum absorption $\lambda_{max}$ so that they can be addressed by different infrared lasers with corresponding emission wavelengths causing colour formation only in the colour forming layer of the addressed infrared dye.

Suitable examples of infrared dyes include, but are not limited to, polymethyl indoliums, metal complex IR dyes, indocyanine green, polymethine dyes, croconium dyes, cyanine dyes, merocyanine dyes, squarylium dyes, chalcogenopyryloarylidene dyes, metal thiolate complex dyes, bis(chalcogenopyrylo)polymethine dyes, oxyindolizine dyes, bis(aminoaryl)polymethine dyes, indolizine dyes, pyrylium dyes, quinoid dyes, quinone dyes, phthalocyanine dyes, naphthalocyanine dyes, azo dyes, (metalized) azomethine dyes and combinations thereof.

A preferred infrared dye is 5-[2,5-bis[2-[1-(1-methylbutyl)benz[cd]indol-2(1H)-ylidene]ethylidene]cyclopentylidene]-1-butyl-3-(2-methoxy-1-methylethyl)-2,4,6(1H,3H,5H)-pyrimidinetrione (CASRN 223717-84-8) represented by the Formula IR-1:

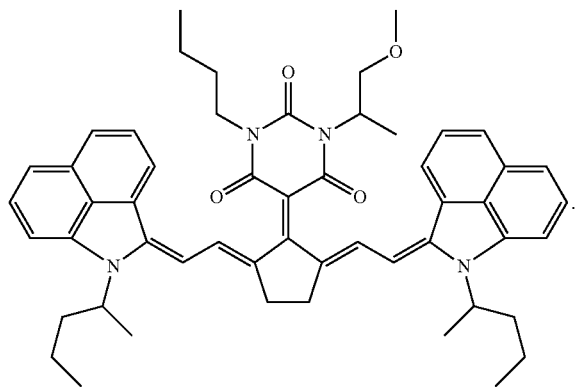

IR-1

The infrared dye IR-1 has an absorption maximum $\lambda_{max}$ of 1052 nm making it very suitable for a Nd-YAG laser having an emission wavelength of 1064 nm.

The infrared red dye is preferably present in the colour forming layer in an amount of 0.01 to 1.0 g/m², more preferably in an amount of 0.02 to 0.5 g/m².

Thermal Acid Generating Compounds

The fragmentation of a colourless dye-precursor in the colour forming layer of the method of colour laser marking an article according to the present invention may be catalyzed or amplified by acids and acid generating agents.

Suitable thermal acid generating agents may be the polymeric acid generating agents based the ethylenically unsaturated polymerizable compounds A-(1) to A-(52) disclosed by U.S. Pat. No. 6,100,009 (FUJI) and herein incorporated as a specific reference.

Suitable non-polymeric acid generating agents are the compounds A-(1) to A-(52) disclosed by U.S. Pat. No. 6,100,009 (FUJI) lacking the ethylenically unsaturated polymerizable group.

The thermal acid generating agent is preferably present in the amount of 10 to 20 wt %, more preferably 14 to 16 wt % based on the total dry weight of the colour forming layer.

Polymeric Binders

The colour forming layer of the security element used in colour laser marking method according to the present invention includes a polymeric binder comprising vinyl acetate and at least 85 wt % of vinyl chloride based on the total weight of the binder.

The polymeric binder is preferably a copolymer including at least 84 wt % of a vinyl chloride and at least 1 wt % of vinyl acetate, more preferably a copolymer including at least 90 wt % of a vinyl chloride and 1 wt % to 10 wt % of vinyl acetate with all wt % based on the total weight of the binder.

In a preferred embodiment, the polymeric binder includes at least 4 wt % of vinyl acetate based on the total weight of the binder. The advantage of having at least 4 wt % of vinyl acetate in the polymeric binder is that the solubility of the polymeric binder is drastically improved in preferred coating solvents, such as methyl ethyl ketone.

In a more preferred embodiment, the polymeric binder consists of vinyl chloride and vinyl acetate.

The polymeric binder is preferably present in the colour forming layer in an amount of 5 to 30 g/m², more preferably in an amount of 6 to 20 g/m².

Polymeric Foils and Supports

The colour forming layer is coated on the polymeric support of the security element. The polymeric support is preferably a transparent polymeric foil provided with a subbing layer.

Suitable polymeric foils include cellulose acetate propionate or cellulose acetate butyrate, polyesters such as polyethylene terephthalate and polyethylene naphthalate, polyamides, polycarbonates, polyimides, polyolefins, polyvinylchlorides, polyvinylacetals, polyethers and polysulphonamides.

In the most preferred embodiment, the transparent polymeric foil is a biaxially stretched polyethylene terephthalate foil (PET-C foil) to be very durable and resistant to scratches and chemical substances.

The polymeric support can be transparent, translucent or opaque, and can be chosen from supports well-known from photographic technology. In a preferred embodiment the support is an opaque support. The advantage of an opaque support, preferably of a white colour, is that any information of the security document is more easily readable and that a colour image is more appealing by having a white background.

The polymeric supports include resin coated paper supports, such as polyethylene coated paper and polypropylene coated paper, and synthetic paper supports such as Synaps™ synthetic paper of Agfa-Gevaert NV.

The support preferably is a single component extrudate, but may also be co-extrudate. Examples of suitable co-extrudates are PET/PETG and PET/PC. Other examples of useful high-quality polymeric supports for the present invention include opaque white polyesters and extrusion blends of polyethylene terephthalate and polypropylene. Also Teslin™ may be used as support.

Polyester supports and especially polyethylene terephthalate supports are preferred because of their excellent properties of dimensional stability. When polyester is used as the support material, a subbing layer may be employed to improve the bonding of layers, foils and/or laminates to the support.

Instead of a coloured or whitened support, an opacifying layer can be coated onto a transparent support. Such opacifying layer preferably contains a white pigment with a refractive index greater than 1.60, preferably greater than 2.00, and most preferably greater than 2.60. The white pigments may be employed singly or in combination. Suitable white pigments include C.I. Pigment White 1, 3, 4, 5, 6, 7, 10, 11, 12, 14, 17, 18, 19, 21, 24, 25, 27, 28 and 32. Preferably titanium dioxide is used as pigment with a refractive index greater than 1.60. Titanium oxide occurs in the crystalline forms of anatase type, rutile type and brookite type. In the present invention the rutile type is preferred because it has a very high refractive index, exhibiting a high covering power.

The manufacturing of PET-C foils and supports is well-known in the art of preparing suitable supports for silver halide photographic films. For example, GB 811066 (ICI) teaches a process to produce biaxially oriented polyethylene terephthalate foils and supports.

The polyethylene terephthalate is preferably biaxially stretched with a stretching factor of at least 2.0, more preferably at least 3.0 and most preferably a stretching factor of about 3.5. The temperature used during stretching is preferably about 160° C.

Methods to obtain opaque polyethylene terephthalate and biaxially oriented films thereof of have been disclosed in, e.g. US 2008238086 (AGFA).

Subbing Layers

The polymeric support may be provided with one or more subbing layers. This has the advantage that the adhesion between the colour forming layer and the polymeric support is improved.

Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers.

The application of subbing layers is well-known in the art of manufacturing polyester supports for silver halide photographic films. For example, the preparation of such subbing layers is disclosed in U.S. Pat. No. 3,649,336 (AGFA) and GB 1441591 (AGFA);

Suitable vinylidene chloride copolymers include: the copolymer of vinylidene chloride, N-tert.-butylacrylamide, n-butyl acrylate, and N-vinyl pyrrolidone (e.g. 70:23:3:4), the copolymer of vinylidene chloride, N-tert.-butylacrylamide, n-butyl acrylate, and itaconic acid (e.g. 70:21:5:2), the copolymer of vinylidene chloride, N-tert.-butylacrylamide, and itaconic acid (e.g. 88:10:2), the copolymer of vinylidene chloride, n-butylmaleimide, and itaconic acid (e.g. 90:8:2), the copolymer of vinyl chloride, vinylidene chloride, and methacrylic acid (e.g. 65:30:5), the copolymer of vinylidene chloride, vinyl chloride, and itaconic acid (e.g. 70:26:4), the copolymer of vinyl chloride, n-butyl acrylate, and itaconic acid (e.g. 66:30:4), the copolymer of vinylidene chloride, n-butyl acrylate, and itaconic acid (e.g. 80:18:2), the copolymer of vinylidene chloride, methyl acrylate, and itaconic acid (e.g. 90:8:2), the copolymer of vinyl chloride, vinylidene chloride, N-tert.-butylacrylamide, and itaconic acid (e.g. 50:30:18:2). All the ratios given between brackets in the above-mentioned copolymers are ratios by weight.

In a preferred embodiment, the subbing layer has a dry thickness of no more than 2 μm or preferably no more than 200 mg/m².

Coating Solvents

For coating the colour forming layer, one or more organic solvents may be used. The use of an organic solvent facilitates the dissolution of the polymeric binder and specific ingredients such as the infrared dye.

A preferred organic solvent is methylethylketone (MEK) because it combines a high solubilizing power for a wide range of ingredients and it provides, on coating the colour forming layer, a good compromise between the fast drying of the colour forming layer(s) and the danger of fire or explosion thereby allowing high coating speeds.

Other Security Features

The laser marked article is preferably combined with one or more other security features to increase the difficulty for falsifying the document.

To prevent forgeries of identification documents, different means of securing are used. One solution consists in superimposing lines or guilloches on an identification picture such as a photograph. In that way, if any material is printed subsequently, the guilloches appear in white on added black background. Other solutions consist in adding security elements such as information printed with ink that reacts to ultraviolet radiation, micro-letters concealed in an image or text etc.

Suitable other security features such as anti-copy patterns, guilloches, endless text, miniprint, microprint, nanoprint, rainbow colouring, 1D-barcode, 2D-barcode, coloured fibres, fluorescent fibres and planchettes, fluorescent pigments, OVD and DOVID (such as holograms, 2D and 3D holograms, Kinegrams™, overprint, relief embossing, perforations, metallic pigments, magnetic material, Metamora colours, microchips, RFID chips, images made with OVI (Optically Variable Ink) such as iridescent and photochromic ink, images made with thermochromic ink, phosphorescent pigments and dyes, watermarks including duotone and multitone watermarks, ghost images and security threads.

EXAMPLES

Materials

All materials used in the following examples were readily available from standard sources such as ALDRICH CHEMICAL Co. (Belgium) and ACROS (Belgium) unless otherwise specified. The water used was deionized water.

Hydran™ APX101H is a waterbased liquid of ionomer type polyester urethane using polyester segments based on terephthalic acid and ethylene glycol and hexamethylene diisocyanate available from DIC Europe GmbH.

Resorcinol from Sumitomo Chemicals.

Resor-sol is a 7.4 wt % aqueous solution of resorcinol (pH 8).

Par is a dimethyltrimethylolamine formaldehyde resin from Cytec industries.

PAR-sol is a 40 wt % aqueous solution of Par.

PEA is Tospearl 120 from Momentive Performance materials.

PEA-sol is a 10 wt % (50/50) aqueous/ethanol dispersion of PEA.

Dowfax™ 2A1 from Pilot Chemicals C is a Alkyldiphenyloxide disulfonate (4.5% wt %).

DOW-sol is a 2.5 wt % solution of Dowfax™ 2A1 in isopropanol.

MEK is an abbreviation used for methylethylketone.

Sunvac™ HH is a copolymer of 86 wt % vinyl chloride and 14 wt % vinyl acetate provided by Yantal Suny Chem International Co., Ltd, China.

Baysilon is the silicon oil Baysilon™ Lackadditive MA available from BAYER.

HDP is the hydrogen donor-precursor CASRN 129104-70-7 prepared according to the synthesis given on page 31 of EP 605149 A (JUJO PAPER) for the compound (19).

CVL is crystal violet lactone (CASRN 1552-42-7), a blue colour forming compound available from Pharmorgana:

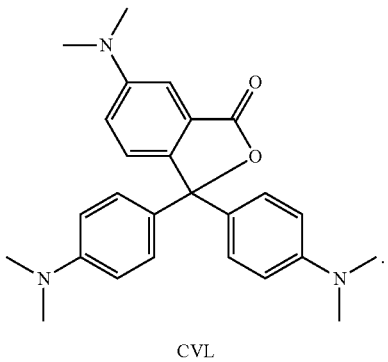

CVL

Rhodamine B (CASRN=81-88-9) is commercially available from TCI Europe.

MAG-1 is a magenta colour forming compound represented by the formula:

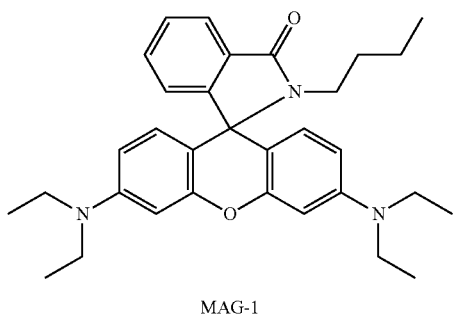 [SMILES: CCCCN1C(=O)c2ccccc2C12c1ccc(N(CC)CC)cc1Oc1cc(N(CC)CC)ccc12]

MAG-1

The magenta colour forming compound MAG-1 was synthesized as follows. A solution of Rhodamine B (24.0 g; 0.05 mol) and n. butylamine (15.0 g; 0.20 mol) in 1-methoxy-2-propanol (750 mL) was heated at 95° C. for 3 hours. After cooling to 45° C., a solution of ice water (25 mL)/methanol (25 mL) and triethylamine (1 mL) was added.

The precipitated crude Mag-1 was filtered and digested at 40° C. in acetonitrile (30 mL) containing triethylamine (0.5 mL). After cooling to 0° C., off-white M-1 was filtered and dried in vacuo.

Yield: 21.5 g (85.5%)

IR-1 is the infrared dye with CASRN 223717-84-8 which was prepared as described below.

The synthesis of intermediate INT-5 was carried out in a cascade mode without purification of the intermediates INT-1, INT-2, INT-3 and INT-4 as described below:

Intermediate INT-1

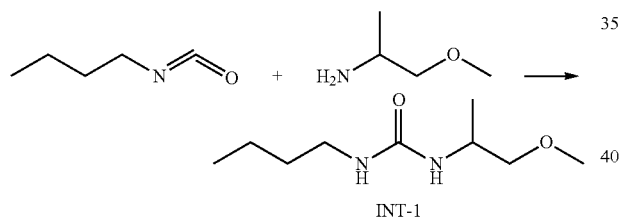

INT-1

To a solution of butyl isocyanate (1.03 eq.) in toluene (70 mL/mol) at 50° C. was added 2-amino-1-methoxy propane (1.00 eq.) over a 2 hour period. After stirring for 30 minutes, excess toluene and reagent were distilled off at 85° C./50 mbar and at 85° C./20 mbar respectively. The mixture was allowed to reach atmospheric pressure under nitrogen.

Intermediate INT-2

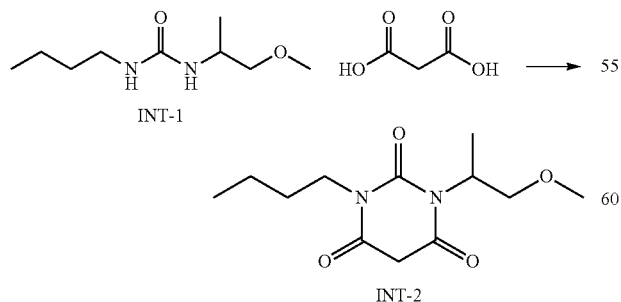

To the warm residue (INT-1) were consecutively added: acetic acid (140 mL/mol), malonic acid (1.00 eq.) and acetic anhydride (2.00 eq.). Under stirring the reaction mixture was gently warmed to 90° C. After stirring for 2.5 hours at 90° C., methanol (70 mL/mol) was added and the mixture was refluxed for 45 minutes. Subsequently, the solvents were removed at 100° C./70 mbar. After cooling to 30° C., methyl t. butyl ether (MTBE) (300 mL/mol) was added. This mixture was extracted 3× with a 5% NaCl solution in water and 2× with a saturated NaCl solution in water. The MTBE was distilled off at 95° C./70 mbar. The remaining water was azeotropically removed with toluene. The mixture was allowed to reach room temperature under nitrogen at atmospheric pressure.

Intermediate INT-3

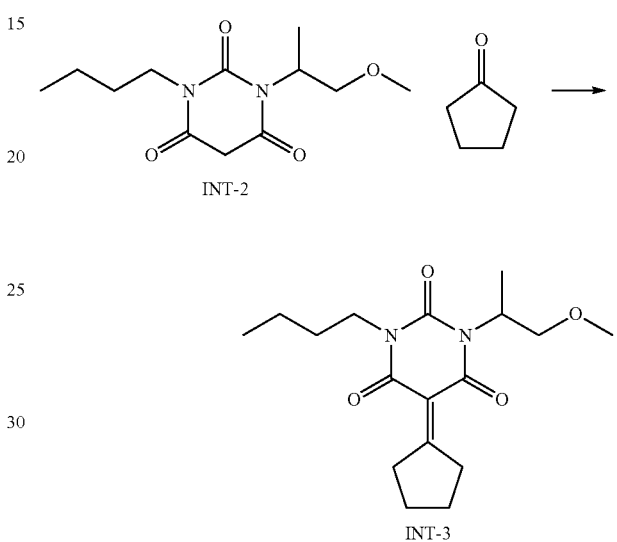

INT-2

INT-3

To the residue (INT-2) were consecutively added under a nitrogen blanket at room temperature: cyclopentanone (1.10 eq.), ammoniumacetate (0.07 eq.) and methanol (150 mL/mol). After refluxing for 4.5 hours, methanol was distilled off at 50 mbar. Remaining methanol and water were azeotropically removed with toluene. After cooling to room temperature, toluene (0.108 kg/mol) was added. This solution was filtered on a stainless steel filter covered with silica (30 g/mol). The reactor and the filter cake were washed with toluene (4×50 mL/mol). This solution of INT-3 was directly used in the next step Intermediate INT-4

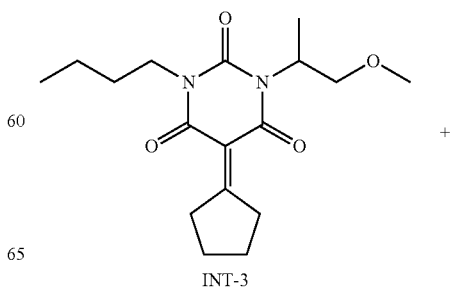

INT-3

+

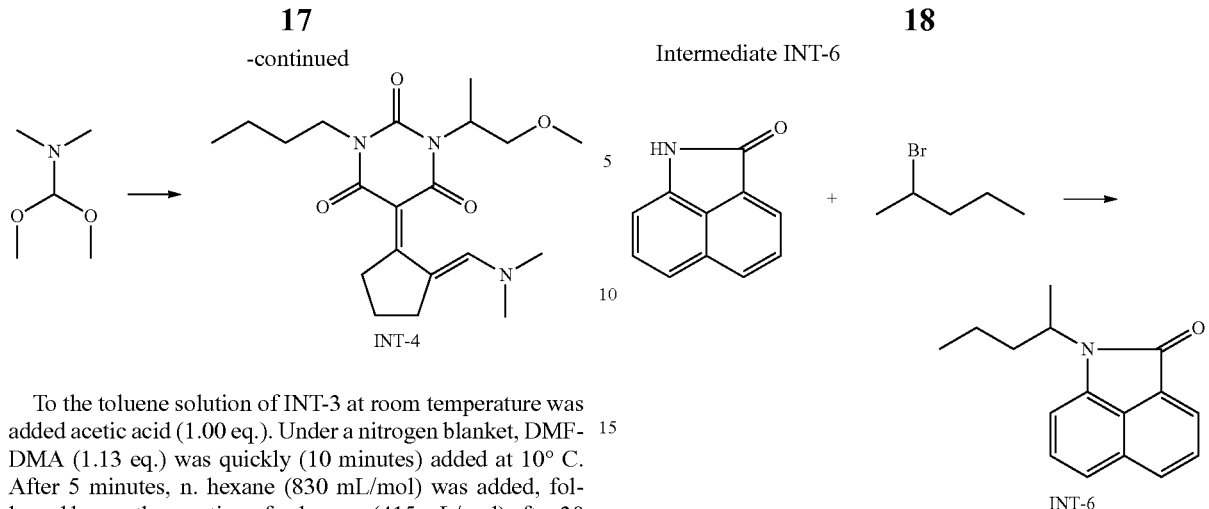

To the toluene solution of INT-3 at room temperature was added acetic acid (1.00 eq.). Under a nitrogen blanket, DMF-DMA (1.13 eq.) was quickly (10 minutes) added at 10° C. After 5 minutes, n. hexane (830 mL/mol) was added, followed by another portion of n. hexane (415 mL/mol) after 30 minutes. After stirring for at least 1 hour (crystallisation) INT-4 is collected by filtration. After washing with n. hexane/toluene (100 mL/mol) and n. hexane (3×125 mL/mol), the product INT-4 was digested with n. hexane (500 mL/mol), filtered and dried at 25° C. for 24 hours.

Intermediate INT-5

To a suspension of INT-4 in ethyl acetate (320 mL/mol) under nitrogen at room temperature was added DMF-DMA (3.49 eq.) in one portion. The mixture was heated to 65° C. and stirred at 65° C. for 25 minutes. While quickly cooling to 15° C., a mixture of MTBE (640 mL/mol) and n. hexane (160 mL/mol) was added. After stirring for 15 minutes, the product was filtered and consecutively washed with ethylacetate/MTBE 80/20 (200 mL/mol), ethylacetate/n. hexane 80/20 (200 mL/mol), ethylacetate/n. hexane 50/50 (200 mL/mol) and n. hexane (200 mL/mol). The rather unstable product (INT-5) was dried at 25° C. for 24 hours.

The synthesis of intermediate INT-7 was carried out in a cascade mode without purification of the intermediate INT-6 as described below:

Intermediate INT-6

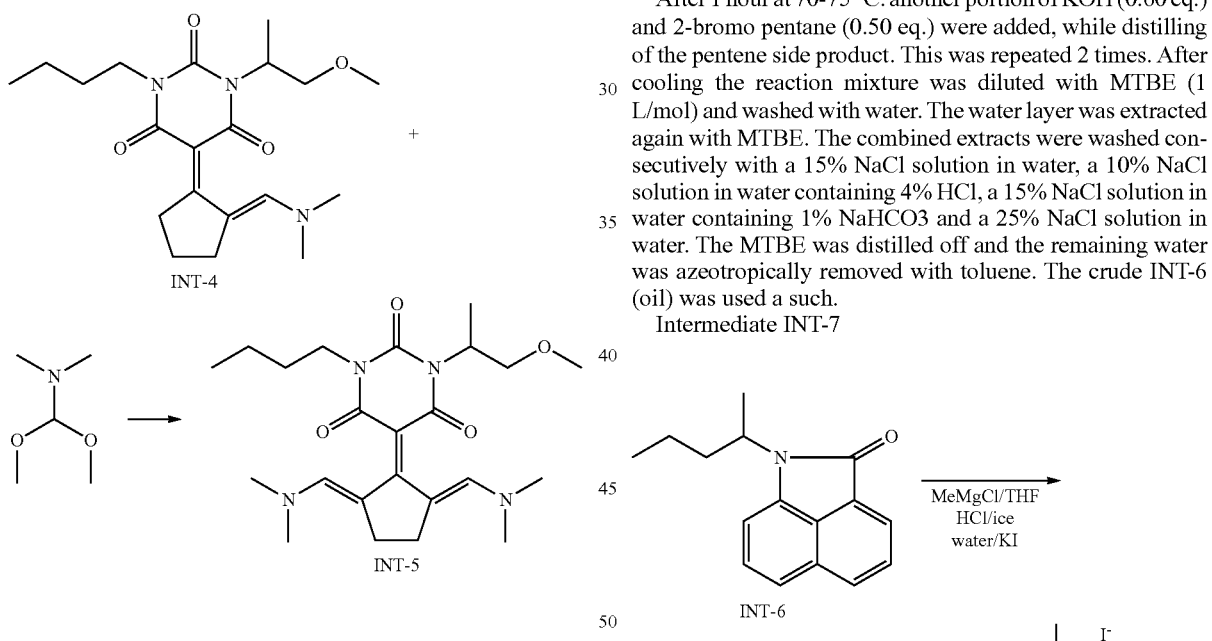

To a nitrogen blanketed solution of 1,8-Naphtholactam (1.00 eq.) in sulfolane (250 mL/mol) at 70° C. were added potassium iodide (0.20 eq.) and dimethylaminopyridine (DMAP) (0.135 eq.).

To this mixture was added potassium hydroxide (KOH) (0.60 eq.) and 2-bromo pentane (0.50 eq.).

After 1 hour at 70-75° C. another portion of KOH (0.60 eq.) and 2-bromo pentane (0.50 eq.) were added, while distilling of the pentene side product. This was repeated 2 times. After cooling the reaction mixture was diluted with MTBE (1 L/mol) and washed with water. The water layer was extracted again with MTBE. The combined extracts were washed consecutively with a 15% NaCl solution in water, a 10% NaCl solution in water containing 4% HCl, a 15% NaCl solution in water containing 1% NaHCO3 and a 25% NaCl solution in water. The MTBE was distilled off and the remaining water was azeotropically removed with toluene. The crude INT-6 (oil) was used a such.

Intermediate INT-7

To nitrogen blanketed solution of INT-6 (1.00 eq.) in THF (100 mL/mol) at room temperature was added methyl magnesiumchloride (1.28 eq.) over 45 minutes (55-60° C.). After stirring for 1 hour at 55° C., the reaction mixture was added to a mixture of HCl (3.9 eq.) in ice water (3.66 kg/mol). After distillative removal of the THF, the aqueous solution was filtered and added to a solution of KI (2.00 eq.) in water (2.1

L/mol). After crystallisation, crude INT-7 was filtered and consecutively washed with water (2.55 L/mol) and ethyl acetate (2.55 L/mol) and dried at 40° C.

Yield: 76%

Infrared Dye IR-1

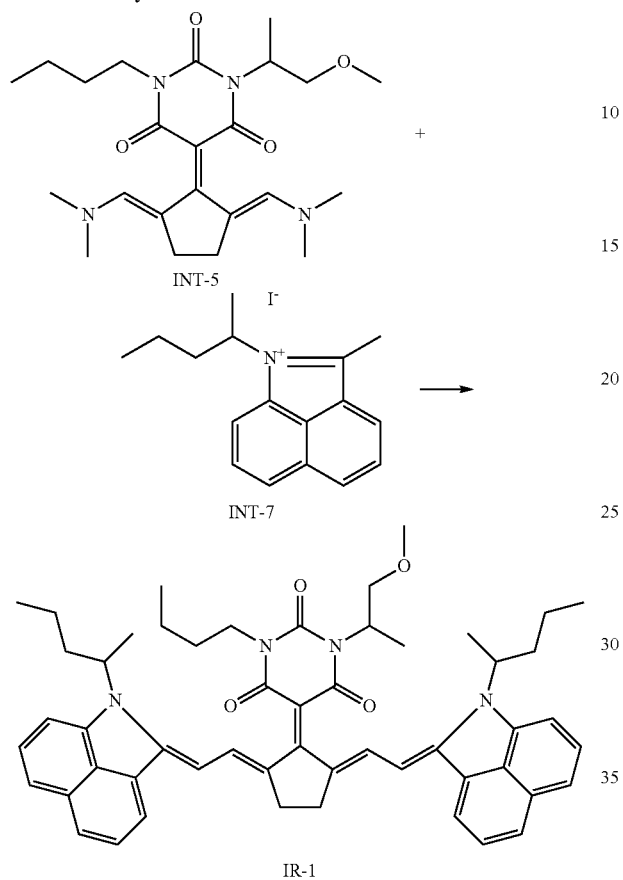

To a stirred suspension of INT-5 (1.00 eq.) in methyl acetate (4 L/mol) at 50° C., was added in portions INT-7 (2.10 eq.) over 5 minutes. After stirring for 1 hour at 55° C., 2 extra portions of INT-7 (each 0.016 eq.) were added. After stirring for 2.5 hours at 55° C., the reaction mixture was cooled to room temperature. Crude IR-1 was isolated by filtration and washed with ethyl acetate (4 L/mol).

After digestion in water (to remove salts) (4 L/mol), filtering and washing on the filter with water (2 L/mol) and MTBE (1.5 L/mol) the product was dried at 40° C. Yield=92%.

IR-2 is an infrared dye prepared according to the following synthesis scheme:

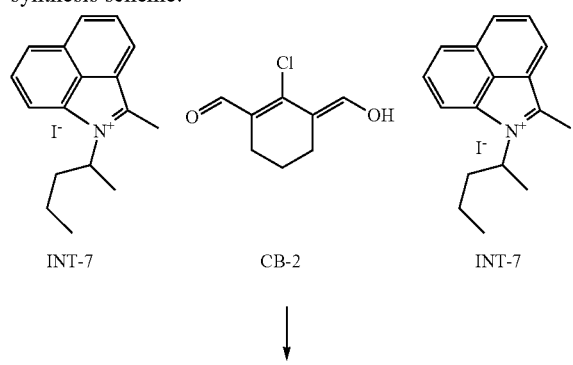

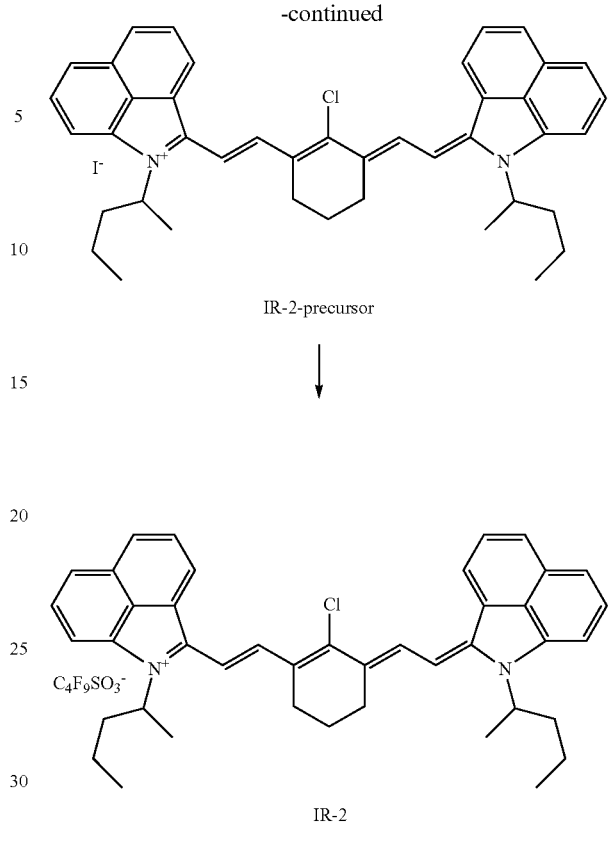

First the chain-builder CB-2 (CASRN 61010-04-6) was synthesized in the same manner as described in [0118] on page 12 of US 2004182268 A (AGFA-GEVAERT). Then to a suspension of intermediate INT-7 (36.5 g; 0.10 mol) and CB-2 (8.63 g; 0.05 mol) in acetic acid (60 mL) at room temperature was added triethylamine (30 mL) upon which the temperature raised to 65° C.

After adding acetic acid anhydride (30 mL), the reaction mixture was stirred at 60° C. for 30 minutes. After cooling to room temperature, ethyl acetate (300 mL) was added and the crude IR-2-precursor precipitated from the reaction mixture. After filtration and washing with ethyl acetate on the filter, the crude IR-2-precursor was purified by dissolution in methylene chloride and a solvent exchange with ethanol, filtered and dried in vacuo.

Yield: 19 g (51%). Absorption maximum (methanol)=1018 nm.

A solution of IR-2-precursor (19 g; 0.026 mol) in methylene chloride (250 mL) was stirred with a solution of potassium nonafluorobutane-1-sulfonate (CASRN29420-49-3) (10.1 g; 0.030 mol) in water (250 mL) for one hour. The methylene chloride phase was separated, washed twice with water (2×300 mL) and solvent exchanged (rotavap) with ethyl acetate (250 mL) crystallizing IR-2. IR-2 was filtered and dried in vacuo.

Yield: 20 g (84%). Absorption maximum $\lambda_{max}$ (methanol)=1018 nm.

IR-3 is an infrared dye prepared according to the following synthesis scheme:

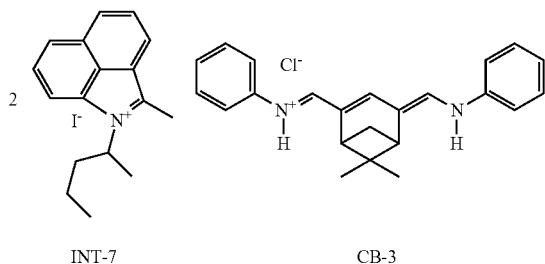

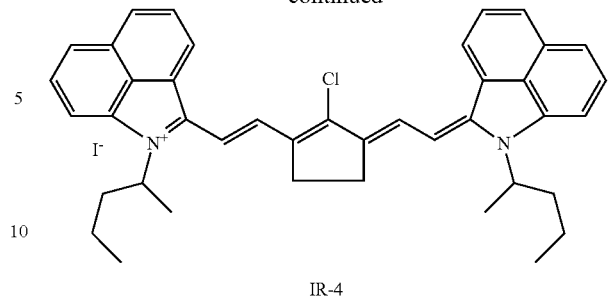

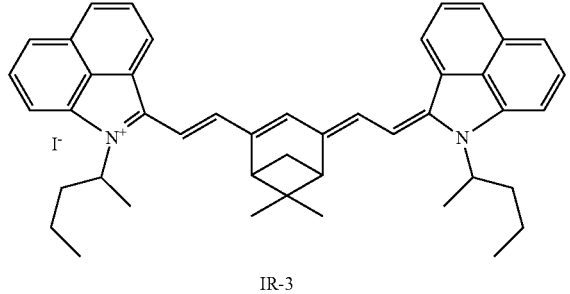

IR-3

First the chain-builder CB-3 was prepared in the same manner as described on page 20-21 of EP 779540 A (AGFA-GEVAERT). Then, to a stirred suspension of CB-3 (18.2 g; 0.05 mol) in acetic acid anhydride (50 mL) at room temperature was added triethylamine (50 mL), raising the temperature to 40° C. After stirring for 10 minutes, a solution of intermediate INT-7 (36.5 g; 0.10 mol) in acetic acid (100 mL) was added, raising the temperature to 65° C. After 15 minutes, the reaction mixture was cooled to room temperature and dropwise added to water (400 mL). After stirring for 30 minutes, the crude IR-3 was filtered off and dissolved in methylene chloride (300 mL). Upon exchanging the solvent for ethyl acetate (rotavap) crude IR-3 separated as a viscous oil. After decanting the ethyl acetate, crude IR-3 was dissolved in methylene chloride (100 mL) and precipitated by slowly adding this solution to methyl tertiary butyl ether (MTBE) (1.5 L). After stirring for 1 hour, IR-3 was filtered off and dried in vacuo.

Yield: 28 g (74%). Absorption maximum $\lambda_{max}$ (methanol)=1006 nm.

IR-4 is an infrared dye prepared according to the following synthesis scheme:

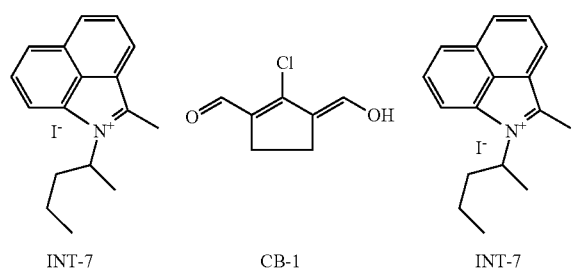

First the chain-builder CB-1 (CASRN=121276-93-5) was prepared in the same manner as described in [0100] on page 11 of US 2004182268 A (AGFA-GEVAERT). To a suspension of INT-7 (7.30 g; 0.02 mol) and CB-1 (1.58 g; 0.01 mol) in dimethyl acetamide (35 mL) was added acetic acid anhydride (4.7 mL; 0.05 mol). After stirring for 2 hours at room temperature, IR-1 was isolated by filtration, washed with dimethyl acetamide (10 mL) and twice with ethanol (2×20 mL) and dried in vacuo.

Yield: 2.61 g (36%). Absorption maximum (methanol)=1044 nm.

Measurement Methods

1. Optical Density

The optical density was measured in reflection using a spectrodensitometer Type Macbeth™ TR924 equipped with a visual filter.

2. Absorption Infrared Dye

The absorption spectrum between 250 and 1500 nm was measured using a Perkin Elmer™ Lambda 900 spectrophotometer.

3. Light Stability

The light stability was measured using an Atlas™ Suntest by exposing the security documents with using a xenon-lamp for a specified number of hours at 765 W/m².

Example 1

This example illustrates that the bleaching of different types of infrared dyes by a low intensity light exposure having a wavelength higher than 440 nm causes no increase in background density (Drain) of the security document.

Preparation of PET1

A coating composition SUB-1 was prepared by mixing the components according to Table 2 using a dissolver.

TABLE 2

| Components of SUB-1 | Volume (mL) |
|---|---|
| deionized water | 700.9 |
| Hydran ™ APX101H | 146.6 |
| Resor-sol | 125.0 |
| PAR-sol | 5.0 |
| PEA-sol | 7.5 |
| DOW-sol | 15.0 |

The coating composition SUB-1 was coated and dried on a 63 μm thick biaxially stretched polyethylene terephthalate sheet to a wet thickness of 100 μm. After drying at 75° C. for 15 minutes, a 63 μm thick transparent and glossy subbed biaxially stretched polyethylene terephthalate sheet PET1 was obtained.

Preparation of Colourless Colour Forming Layers

The coating composition COL-1 to COL-5 were prepared by mixing all components using a dissolver in MEK and were then coated with an Elcometer Bird Film Applicator (from ELCOMETER INSTRUMENTS) on the subbed PET-C support PET1 at a wet coating thickness of 100 μm and subsequently dried for 2 minutes at 20° C. on the film applicator and for a further 15 minutes in an oven at 75° C. to deliver the security elements SE-1 to SE-5. The colour forming layer of the security elements SE-1 to SE-5 having a dry weight composition as shown by Table 3.

TABLE 3

| mg/m² of compound: | SE-1 | SE-2 | SE-3 | SE-4 | SE-5 |
|---|---|---|---|---|---|
| Baysilon | 0.012 | 0.012 | 0.012 | 0.012 | 0.012 |
| Sunvac ™ HH | 7.500 | 7.500 | 7.500 | 7.500 | 7.500 |
| IR-1 | 0.030 | — | — | — | — |
| IR-2 | — | 0.030 | — | — | — |
| IR-3 | — | — | 0.030 | — | — |
| IR-4 | — | — | — | 0.030 | 0.030 |
| HDP | 1.625 | 1.625 | 1.625 | 1.625 | 1.625 |
| CVL | 1.500 | 1.500 | 1.500 | 1.500 | — |
| MAG-1 | — | — | — | — | 1.500 |
| Total dry weight = | 10.667 | 10.667 | 10.667 | 10.667 | 10.667 |

Preparation of Security Document Precursor SDP-1 to SDP-5

The security elements SE-1 to SE-5 were then laminated onto a 500 μm opaque PETG core from WOLFEN to deliver the security document precursors SDP-1 to SDP-5. The lamination was performed using an Oasys OLA6/7 plate laminator with the settings: LPT=115° C., LP=40, Hold=210 sec, HPT=115° C., HP=40 and ECT=50° C.

Evaluation and Results

After lamination, a test image containing a wedge with different grey-levels (ten squares of 7×9 mm) was laser marked on the security document precursors SDP-1 to SDP-5 through the PET-C foil using a Rofin RSM Powerline E laser (10 W) with settings 33 ampere and 44 kHz in order to deliver the security documents SD-1 to SD-5 having the properties as shown in Table 4. $D_{min}$ is the background density, i.e. the optical density of a non-laser marked area. $D_{max}$ is the optical density of the tenth square of 7×9 mm which received the maximum infrared exposure by the laser.

TABLE 4

| Security document | Type | Infrared dye $\lambda_{max}$ (nm) | Absorption at $\lambda_{max}$ | Optical density $D_{min}$ | $D_{max}$ |
|---|---|---|---|---|---|
| SD-1 | IR-1 | 1052 | 1.046 | 0.22 | 1.05 |
| SD-2 | IR-2 | 1050 | 1.068 | 0.23 | 0.87 |
| SD-3 | IR-3 | 1040 | 0.974 | 0.27 | 0.75 |
| SD-4 | IR-4 | 1080 | 1.081 | 0.28 | 0.64 |
| SD-5 | IR-4 | 1080 | 1.025 | 0.27 | 0.60 |

The security documents SD-1 to SD-5 were then exposed to Xenon light at 765 W/m² using so-called L-filters which cut off all light below a certain wavelength. For example, when using a L445-filter then all the light below 445 nm is blocked from reaching the security document. Several properties were measured after the light exposure corresponding to step b) of the laser marking method according to the present invention as shown in Table 5. The % Loss in IR is the decrease in absorption at $\lambda_{max}$ expressed as a percentage. $D_{maxb}$ is the $D_{max}$ which was obtained by a new infrared laser exposure on a previously non-laser marked area. The value of "$D_{min}$ increase" represents the increase in $D_{min}$ after the light exposure of step b).

TABLE 5

| Security document | L-filter | After light exposure (step b) | | |
|---|---|---|---|---|
| | | % Loss in IR | $D_{maxb}$ | $D_{min}$ increase |
| SD-1 | L295 | 65% | 0.75 | 0.53 |
| SD-1 | L345 | 55% | 0.73 | 0.55 |
| SD-1 | L400 | 28% | 0.50 | 0.23 |
| SD-1 | L445 | 10% | 0.70 | 0.00 |
| SD-1 | L495 | 5% | 0.82 | 0.00 |
| SD-1 | L550 | 0% | 1.03 | 0.00 |
| SD-1 | L610 | 0% | 0.96 | 0.00 |
| SD-1 | L695 | 0% | 1.01 | 0.00 |
| SD-2 | L295 | 46% | 0.67 | 0.47 |
| SD-2 | L345 | 42% | 0.65 | 0.41 |
| SD-2 | L400 | 26% | 0.45 | 0.18 |
| SD-2 | L445 | 9% | 0.57 | 0.02 |
| SD-2 | L495 | 5% | 0.66 | 0.01 |
| SD-2 | L550 | 15% | 0.34 | 0.00 |
| SD-2 | L610 | 2% | 0.72 | 0.00 |
| SD-2 | L695 | 7% | 0.56 | 0.01 |
| SD-3 | L295 | 37% | 0.69 | 0.43 |
| SD-3 | L345 | 32% | 0.68 | 0.42 |
| SD-3 | L400 | 20% | 0.46 | 0.14 |
| SD-3 | L445 | 10% | 0.39 | 0.00 |
| SD-3 | L495 | 2% | 0.58 | 0.00 |
| SD-4 | L295 | 51% | 0.72 | 0.48 |
| SD-4 | L345 | 43% | 0.70 | 0.46 |
| SD-4 | L400 | 20% | 0.53 | 0.20 |
| SD-4 | L445 | 11% | 0.46 | 0.00 |
| SD-4 | L495 | 4% | 0.55 | 0.00 |
| SD-5 | L295 | 80% | 0.84 | 0.56 |
| SD-5 | L345 | 54% | 0.62 | 0.31 |
| SD-5 | L400 | 12% | 0.50 | 0.01 |
| SD-5 | L445 | 8% | 0.50 | 0.00 |
| SD-5 | L495 | 0% | 0.54 | 0.00 |
| SD-5 | L550 | 1% | 0.53 | 0.00 |
| SD-5 | L610 | 0% | 0.59 | 0.02 |
| SD-5 | L695 | 0% | 0.55 | 0.01 |

From Table 5, it should be clear that only security documents exposed using an L-filter of 445 nm or higher exhibited a bleaching of the infrared dye without significant increase in background density. This shows that the security document can be "inactivated" by bleaching the infrared dye without deterioration of the appearance of the security document.

Example 2

This example illustrates that the progressive bleaching of an infrared dye by a low intensity light exposure having a wavelength between 455 nm and 650 nm without causing significant increase of background density ($D_{min}$) of the security document.

Preparation of Security Document Precursor SDP-6

A set of five security document precursors SDP-6 were prepared in exactly the same way as SDP-1.

Evaluation and Results

After lamination, a test image containing a wedge with different grey-levels (ten squares of 7×9 mm) was laser marked on the five security document precursors SDP-6 through the PET-C foil using a Rofin RSM Powerline E laser (10 W) with settings 33 ampere and 44 kHz in order to deliver the security documents SD-6a to SD-6e.

The security documents SD-6b to SD-6e were then exposed to Xenon light at 765 W/m² for an increasing duration using a so-called U-filter which cut off all light below a certain wavelength and above a certain wavelength. The U445-650 filter placed between the security document and the laser prevents that the security document is exposed to light below 445 nm and above 650 nm. Several properties were measured after the light exposure corresponding to step b) of the laser marking method according to the present invention as shown in Table 6.

$D_{min}$ is the background density after, if performed (not so for SD-6a), the light exposure of step b). D7, D8, D9 and $D_{max}$ are the optical densities of the seventh to tenth square of 7×9 mm which received the infrared exposure by the laser and, if performed, also the light exposure of step b).

TABLE 6

| Security document | Exposure time of step b) | $D_{min}$ | D 7 | D 8 | D 9 | $D_{max}$ |
|---|---|---|---|---|---|---|
| SD-6a | 0 hours | 0.23 | 0.70 | 0.87 | 0.92 | 1.01 |
| SD-6b | 2 hours | 0.24 | 0.50 | 0.57 | 0.63 | 0.92 |
| SD-6c | 4 hours | 0.24 | 0.43 | 0.50 | 0.59 | 0.91 |
| SD-6d | 8 hours | 0.25 | 0.36 | 0.42 | 0.49 | 0.60 |
| SD-6e | 16 hours | 0.24 | 0.30 | 0.31 | 0.33 | 0.40 |

Table 6 shows that the capability of forming a colour image decreased with prolonged exposure, which in daily life makes it very difficult to falsify the colour image of the security document after its issue

The invention claimed is:

1. A method for preparing a colour laser marked article comprising the steps of:
   a) infrared laser marking a security element including a polymeric support and a colour forming layer comprising a colour forming compound, an infrared dye and a polymeric binder comprising vinyl acetate and at least 85 wt % of vinyl chloride based on the total weight of the binder; and
   b) exposing the laser marked security element with light having a wavelength higher than 440 nm.

2. The method according to claim 1, wherein the light of the exposure in step b) has a wavelength of less than 700 nm.

3. The method according to claim 2, wherein the exposure in step b) is performed utilizing a laser or a LED having an emission wavelength between 440 nm and 700 nm.

4. The method according to claim 1, wherein the exposure in step b) is an overall exposure.

5. The method according to claim 1, wherein the polymeric binder includes at least 4 wt % of vinyl acetate.

6. The method according to claim 1, wherein the security element further includes a hydrogen donor precursor.

7. The method according to claim 6, wherein the hydrogen donor precursor is 4,4'-Bis(tert-butoxycarbonyloxy)diphenylsulfone.

8. The method according to any one of claim 1, wherein the colour forming compound is crystal violet lactone.

9. The method according to claim 1, wherein the security element is laser marked through a transparent biaxially stretched polyethylene terephthalate foil.

10. The method according to claim 1, wherein the security element includes electronic circuitry.

11. The method according to claim 1, wherein the security element is a security document precursor.

12. A colour laser marked article including a polymeric support and a colour forming layer comprising a colour forming compound, an infrared dye and a polymeric binder comprising vinyl acetate and at least 85 wt % of vinyl chloride based on the total weight of the binder character; and
   including less infrared dye in a non-laser marked area of the colour laser marked article than in a laser marked area of the colour laser marked article.

13. The colour laser marked article according to claim 12, wherein the security element contains more than one colour forming layer.

14. The colour laser marked article according to claim 13, wherein the article is a security document.

15. A method of impeding the alteration by colour laser marking of an infrared laser marked security element including a colour forming compound, an infrared dye and a polymeric binder including vinyl acetate and at least 85 wt % of vinyl chloride based on the total weight of the binder, the method comprising utilizing a light having a wavelength between 440 nm and 700 nm.

* * * * *